United States Patent
Unno (10) Patent No.: US 6,577,647 B1
(45) Date of Patent: Jun. 10, 2003

(54) SYNCHRONIZATION SYSTEM AND METHOD, AND RECORDING MEDIUM

(75) Inventor: Yoshihiro Unno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/346,928

(22) Filed: Jul. 2, 1999

(30) Foreign Application Priority Data

Jul. 6, 1998 (JP) .......................................... 10-204249

(51) Int. Cl.[7] ................................................ H04J 3/06
(52) U.S. Cl. .................................................... 370/503
(58) Field of Search ................................ 370/503–515, 370/209, 226; 375/114, 222; 359/110–114, 158, 173

(56) References Cited

U.S. PATENT DOCUMENTS

| 5,309,474 A | * | 5/1994 | Gilhousen et al. ........... 370/209 |
| 5,497,395 A | * | 3/1996 | Jou ............................ 370/209 |
| 5,629,983 A | * | 5/1997 | Fujimoto .................... 370/506 |

FOREIGN PATENT DOCUMENTS

| JP | 2-19950   | 1/1990  |
| JP | 5-161181  | 6/1993  |
| JP | 7-170283  | 7/1995  |
| JP | 9-298493  | 11/1997 |
| JP | 10-70526  | 3/1998  |
| JP | 10-142361 | 5/1998  |

OTHER PUBLICATIONS

M. Yokoyama, Spread Spectrum Communication System, Kagaku Gijutsu Shuppan–sha, Tokyo, 1988, pp. 395–425.

* cited by examiner

Primary Examiner—Kwang Bin Yao
Assistant Examiner—Prenell Jones
(74) Attorney, Agent, or Firm—Sughrue Mion, PLLC (57) ABSTRACT

A strict commercial time synchronization system, method and apparatus therefore is provided. Transmission information data and N bits data in a PN signal generated from a PN generator are transmitted to a down stream station by multiplexing circuit. Then, the transmission information data and N bits data are demultiplexed by a demultiplexing circuit into the transmission information data and the PN signal. An error between this PN signal and generated by a PN generator is detected by a timing detection circuit. The operation timing of the PN generator is corrected corresponding to this error. The corrected PN signal and the transmission information data are transmitted by a multiplexing circuit to an upstream station. The timing of the PN-signal is shifted ahead by half the time corresponding to the error detected.

9 Claims, 5 Drawing Sheets

SYNCHRONIZATION SYSTEM AND METHOD, AND RECORDING MEDIUM

BACKGROUND OF THE INVENTION

1. Field of the Invention

The present invention generally relates to a synchronization system, a synchronization method, and a recording medium, and more particularly, to a synchronization system and a synchronization method which realize strict commercial time synchronization by advancing the timing of generation of a PN (Pseudo-random Noise) signal in a upstream station by a transmission line delay.

2. Description of the Related Art

Hereinafter, a conventional commercial time synchronization system will be described. An exchange and a first radio station are connected to each other through a first transmission line. The aforementioned exchange and a second radio station are connected to each other through a second transmission line.

For example, 1.5-megabits-per-second (Mbps) high-speed digital commercial transmission lines are used as the aforementioned first and second transmission lines. A master station of a time synchronization system is the exchange. Time in (or operating timing of) each of the aforementioned first and second radio stations is controlled by the aforesaid exchange.

Transmission information data is transmitted by being divided into frames. The frame length of frames is set at, for instance, 20 milliseconds (msec). Further, time synchronization is realized by time synchronization bits (or frame synchronization bits) periodically sent from the aforementioned exchange to the aforesaid first and second transmission lines.

The aforementioned exchange is operative to send a frame synchronization bit every frame period. The aforesaid first and second radio stations are operative to establish frame synchronization by detecting frame synchronization bits sent from the aforementioned exchange, and to extract transmission information data. Further, the aforementioned first and second radio stations are adapted to operate by employing a signal indicating the timing of detection of a frame synchronization bit as a master timing signal.

Therefore, the operation timing of a upstream station differs from that of a downstream station by a transmission line delay. Usually, the transmission line delay is several msec or so. In the case of this conventional system, commercial synchronization can be realized with such a degree of accuracy that this transmission line delay is allowed.

Thus, according to a conventional commercial synchronization method, the operation timing of a upstream station differs from that of a downstream station by a transmission line delay. Consequently, the conventional commercial synchronization method has a drawback in that commercial synchronization cannot be realized with accuracy higher than that achieved by allowing the transmission line delay.

SUMMARY OF THE INVENTION

The present invention is accomplished in view of such circumstances. Accordingly, an object of the present invention is to realize strict commercial time synchronization with such a degree of accuracy that a transmission delay comparable to the transmission rate of a transmission line is allowed.

To achieve the foregoing object, according to an aspect of the present invention, there is provided a synchronization system for synchronizing first and second devices. The aforesaid first device comprises first PN signal generating means for generating a PN signal in synchronization with a predetermined timing signal, first multiplexing means for transmitting a multiplexing signal obtained by multiplexing transmission information data to be transmitted and the aforesaid PN signal, first demultiplexing means for receiving a signal transmitted from the aforesaid second device and for demultiplexing the received signal into the transmission information data and the PN signal, and first detection means for detecting a first timing error that is an error between the aforesaid PN signal, which is obtained by demultiplexing by the aforesaid first demultiplexing means, and the aforesaid PN signal generated by the aforesaid first PN signal generating means.

The aforesaid second device comprises second PN signal generating means for generating a PN signal in synchronization with a predetermined timing signal, second multiplexing means for transmitting a multiplexing signal obtained by multiplexing transmission information data to be transmitted and the aforesaid PN signal, second demultiplexing means for receiving a signal transmitted from the aforesaid first device and for demultiplexing the received signal into the transmission information data and the PN signal, and second detection means for detecting a first timing error that is an error between the aforesaid PN signal, which is obtained by demultiplexing by the aforesaid second demultiplexing means, and the aforesaid PN signal generated by the aforesaid second PN signal generating means.

The aforesaid first PN signal generating means shifts operation timing thereof by a time corresponding to half the first timing error detected by the aforesaid first detection means. The aforesaid second PN signal generating means corrects operation timing thereof in such a way as to eliminate the aforesaid second timing error detected by the aforesaid second detection means.

Further, in the case of an embodiment of this synchronization system, the aforesaid first device further comprises first timing signal generating means for generating a predetermined timing signal. The aforesaid second device further comprises second timing signal generating means.

In this embodiment, the aforesaid first PN signal generating means determines an operation timing thereof in synchronization with a timing signal generated by the aforesaid first timing signal generating means. The aforesaid second PN signal generating means determines operation timing thereof in synchronization with a timing signal generated by the aforesaid second timing signal generating means.

Furthermore, in the case of another embodiment of the synchronization system, the aforesaid first multiplexing means transmits arbitrary N bits data, which are represented by a PN signal generated by the aforesaid first PN signal generating means, when transmission information data to be transmitted is not present. The aforesaid second multiplexing means transmits arbitrary N bits data, which are represented by a PN signal generated by the aforesaid second PN signal generating means, when there is no transmission information data to be transmitted.

Moreover, in the case of another embodiment of the synchronization system, the aforesaid first and second multiplexing means transmit predetermined discrimination information immediately before a PN signal is transmitted. The aforesaid first and second demultiplexing means regard signals transmitted immediately after the aforesaid discrimination information as PN signals.

Furthermore, in the case of another embodiment of the synchronization system, the aforesaid first detection means detects the aforesaid first timing error by searching a pattern of one period of a PN signal, which is generated by the aforesaid first PN signal generating means, for a consecutive N-bit pattern matching an N-bit pattern represented by a PN signal obtained by demultiplexing by the aforesaid first demultiplexing means. The aforesaid second detection means detects the aforesaid second timing error by searching a pattern of one period of a PN signal, which is generated by the aforesaid second PN signal generating means, for a consecutive N-bit pattern matching an N-bit pattern represented by a PN signal obtained by demultiplexing by the aforesaid second demultiplexing means.

Additionally, in the case of another embodiment of the synchronization system, timing control is performed so that a pattern represented by a PN signal, which is generated by the aforesaid first PN signal generating means of said first device at a time point $(t-\tau)$ where $\tau$ designates a time period during which transmission information data is transmitted from the aforesaid first device to the aforesaid second device, and t denotes a current time point, matches a pattern represented by a PN signal, which is generated by the aforesaid second PN signal generating means of the aforesaid second device at the point in time t.

Further, according to another aspect of the present invention, there is provided a synchronization method having a first process to be performed in a first device and a second process to be performed in a second device, for synchronizing the aforesaid first and second devices. The aforesaid first process comprises a first PN signal generating step of generating a PN signal in synchronization with a predetermined timing signal, a first multiplexing step of transmitting a multiplexing signal obtained by multiplexing transmission information data to be transmitted and the aforesaid PN signal, a first demultiplexing step of receiving a signal transmitted from the aforesaid second device and demultiplexing the received signal into transmission information data and a PN signal, and a first detection step of detecting a first timing error that is an error between said PN signal, which is obtained by demultiplexing at the aforesaid first demultiplexing step, and the aforesaid PN signal generated at the aforesaid first PN signal generating step.

The aforesaid second process comprises a second PN signal generating step of generating a PN signal in synchronization with a predetermined timing signal, a second multiplexing step of transmitting a multiplexing signal obtained by multiplexing transmission information data to be transmitted and the aforesaid PN signal, a second demultiplexing step of receiving a signal transmitted from the aforesaid first device and demultiplexing the received signal into transmission information data and a PN signal, and a second detection step of detecting a second timing error that is an error between the aforesaid PN signal, which is obtained by demultiplexing at the aforesaid second demultiplexing step, and the aforesaid PN signal generated at the aforesaid second PN signal generating step.

At the second PN signal generating step, PN-signal generation timing is corrected in such a manner as to eliminate the aforesaid second timing error detected at the aforesaid second detection step. At the aforesaid first PN signal generating step, PN-signal generation timing is shifted ahead by a time period corresponding to half the first timing error detected at the aforesaid first detection step.

Furthermore, according to another aspect of the present invention, there is provided a recording medium on which a program having a first process to be performed in a first device and a second process to be performed in a second device is recorded for synchronizing said first and second devices.

The aforesaid first process comprises a first PN signal generating step of generating a PN signal in synchronization with a predetermined timing signal, a first multiplexing step of transmitting a multiplexing signal obtained by multiplexing transmission information data to be transmitted and the aforesaid PN signal, a first demultiplexing step of receiving a signal transmitted from the aforesaid second device and demultiplexing the received signal into transmission information data and a PN signal, and a first detection step of detecting a first timing error that is an error between the aforesaid PN signal, which is obtained by demultiplexing at the aforesaid first demultiplexing step, and the aforesaid PN signal generated at the aforesaid first PN signal generating step.

The aforesaid second process comprises a second PN signal generating step of generating a PN signal in synchronization with a predetermined timing signal, a second multiplexing step of transmitting a multiplexing signal obtained by multiplexing transmission information data to be transmitted and the aforesaid PN signal, a second demultiplexing step of receiving a signal transmitted from the aforesaid first device and demultiplexing the received signal into transmission information data and a PN signal, and a second detection step of detecting a second timing error that is an error between the aforesaid PN signal, which is obtained by demultiplexing at the aforesaid second demultiplexing step, and the aforesaid PN signal generated at the aforesaid second PN signal generating step.

At the aforesaid second PN signal generating step, PN-signal generation timing is corrected in such a manner as to eliminate the aforesaid second timing error detected at the aforesaid second detection step.

At the aforesaid first PN signal generating step, PN-signal generation timing is shifted ahead by a time period corresponding to half the first timing error detected at the aforesaid first detection step.

BRIEF DESCRIPTION OF THE DRAWINGS

Other features, objects, and advantages of the present invention will become apparent from the following description of a preferred embodiment with reference to the drawings in which like reference characters designate like or corresponding parts throughout several views, and in which.

DESCRIPTION OF THE PREFERRED EMBODIMENTS

Hereinafter, a preferred embodiment of the present invention will be described in detail with reference to the accompanying drawings.

Figure 1:
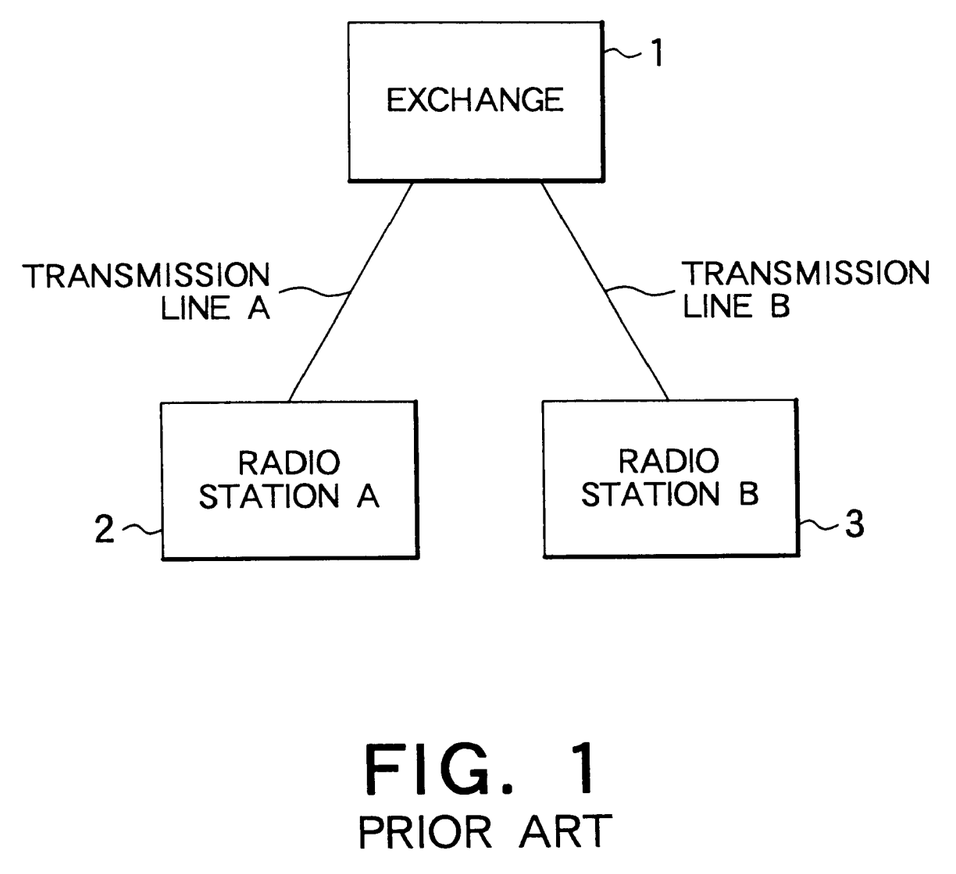
FIG. 1 is a diagram illustrating a conventional commercial time synchronization method.
Figure 2:
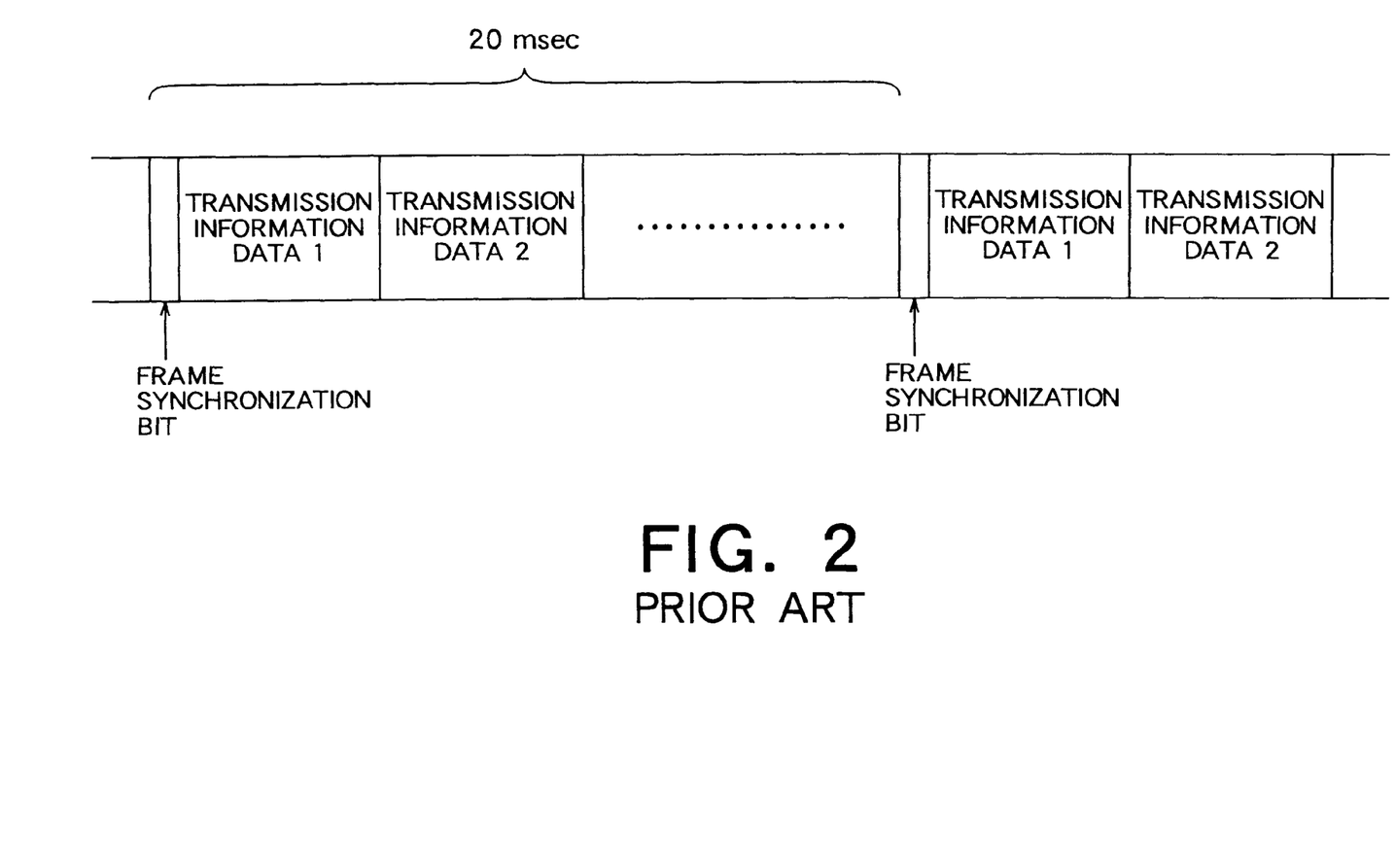
FIG. 2 is a diagram illustrating a conventional format of a transmission signal including a frame synchronization bit.

FIGS. 1 and 2 illustrate a system commonly used as a conventional commercial synchronization system. As illustrated in FIG. 1, an exchange 1 and a radio station A2 are connected to each other through a transmission line A. Further, the exchange 1 and a radio station B3 are connected to each other through a transmission line B.

For example, 1.5 Mbps high-speed digital commercial transmission lines are used as the transmission lines A and B. A master station of a time synchronization system is the exchange 1. Time in (or operating timing of) each of the radio stations A and B is controlled by the exchange 1.

FIG. 2 shows a format of transmission information data to be transmitted through the transmission lines A and B. As shown in FIG. 2, transmission information data is transmitted by being divided into frames. The frame length of frames is set at, for instance, 20 msec. Further, time synchronization is realized by time synchronization bits (or frame synchronization bits) periodically sent from the exchange 1 to the transmission lines A and B.

The exchange 1 is operative to send a frame synchronization bit every frame period. The radio stations A and B are operative to establish frame synchronization by detecting frame synchronization bits sent from the exchange 1, and to extract transmission information data. Further, the radio stations A and B are adapted to operate by employing a signal indicating the timing of detection of a frame synchronization bit as a master timing signal.

Therefore, the operation timing of a upstream station differs from that of a downstream station by a transmission line delay. Usually, the transmission line delay is several msec or so. In the case of this conventional system, commercial synchronization can be realized with such a degree of accuracy that such a transmission line delay is allowed. Hereunder, the embodiment of the present invention will be described by referring to FIGS. 3 to 5. The commercial synchronization system of the present invention is created so as to realize strict commercial time synchronization in comparison with the commercial time synchronization achieved according to the aforementioned conventional method. As will be described later, time synchronization accuracy of the system of the present invention is such that a transmission delay comparable to the transmission rate of an commercial transmission line is allowed. When the rate of the transmission line is 1.5 Mbps, this transmission delay is 0.7 microseconds (namely, a time corresponding to one bit of 1.5 Megabits) or so.

Figure 3:
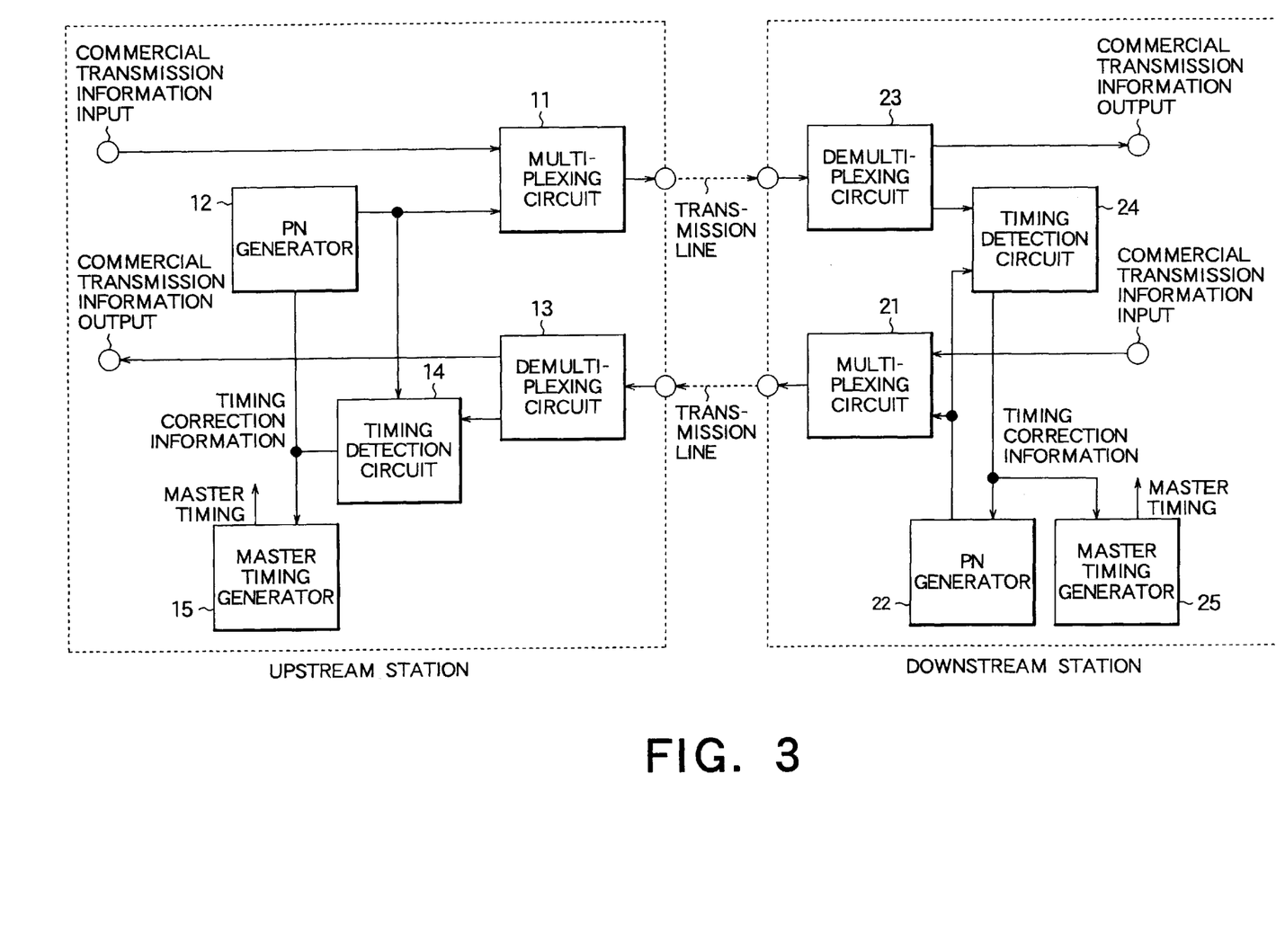
FIG. 3 is a block diagram illustrating the configuration of a commercial time synchronization system to which a synchronization system of the present invention is applied.

First, the principle for synchronizing the upstream station and the downstream station will be described hereinbelow by referring to FIGS. 3 to 5. Hitherto, employing the PN sequence therefor has been well known. For example, what is called an M-sequence (namely, a Maximal-length (shift-register) sequence), a quadratic residue sequence and what is called a twin prime (number) sequence have been known as the PN sequence.

The details of the PN sequence are described in publications, for example, M. Yokoyama: Spread Spectrum Communication System, p. 393, Kagaku Gijutsu Shuppansha, Tokyo, 1988.

In the following description, the M-sequence is employed by way of example. Further, each PN generator comprises shift registers of stages of the number (N) of the PN sequence and adders (more precisely, exclusive-OR circuits).

Incidentally, a generating polynomial is defined by the following equation:

$$G(x) = x^{15} + x^{13} + x^9 + x^8 + x^7 + x^5 + 1$$

Figure 4:
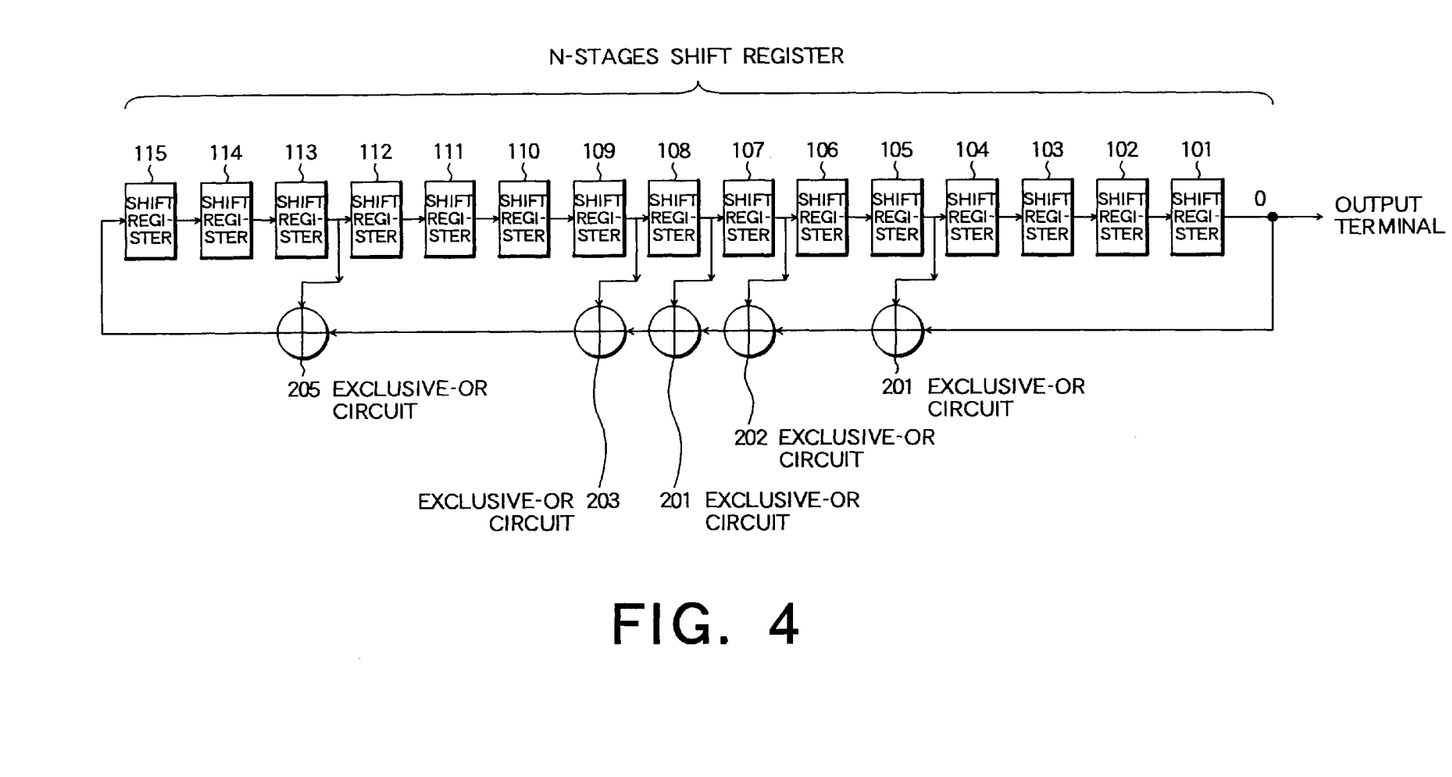
FIG. 4 is a block diagram illustrating the configuration of each of PN generators 12 and 22 of FIG. 3.
Figure 5:
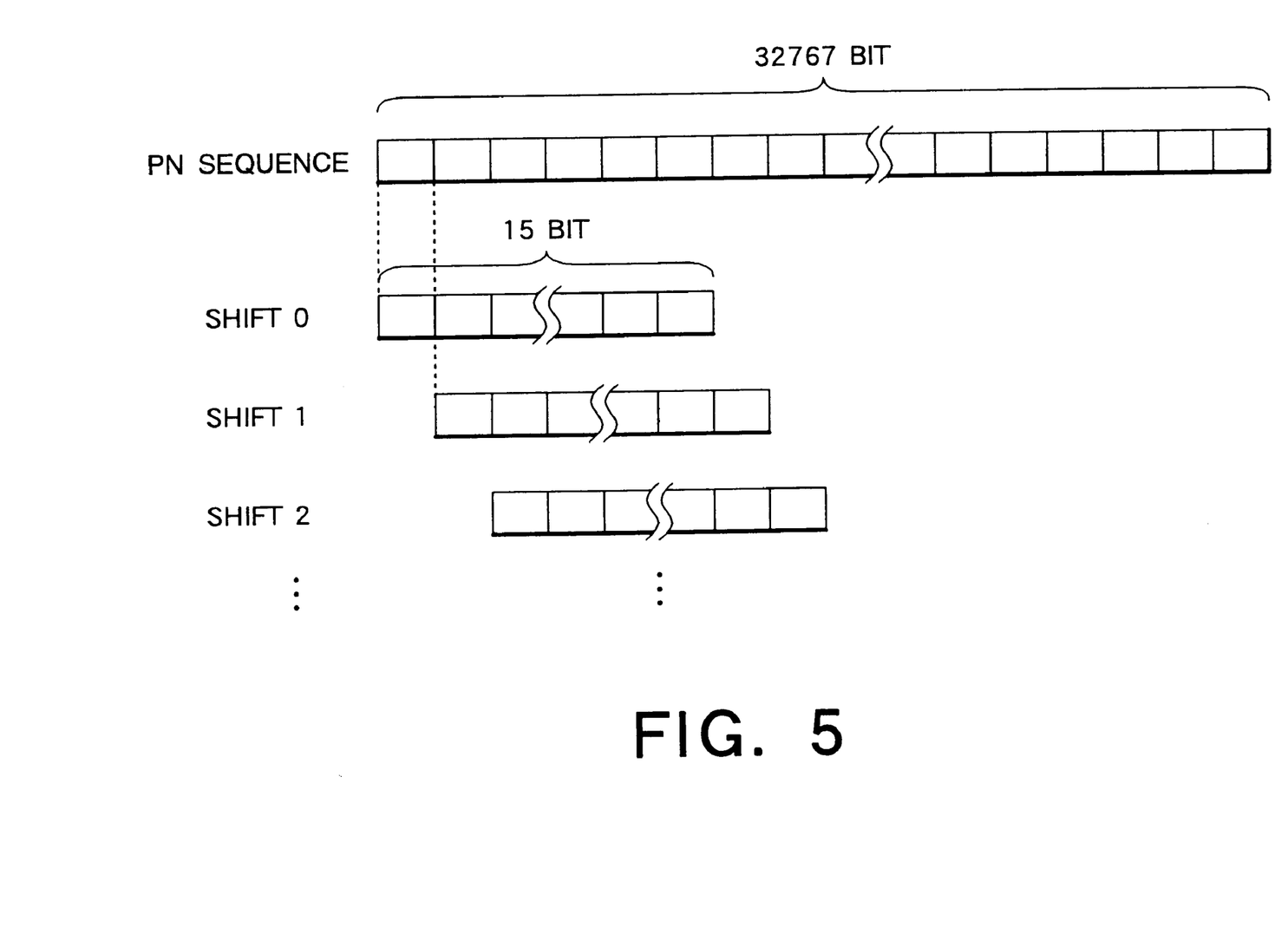
FIG. 5 is a diagram illustrating a method of searching a PN sequence for a 15-bit PN signal pattern.

In this case, each of the PN generators is configured as illustrated in, for example, FIG. 4.

Namely, each of the PN generators consists of shift registers of 15 stages 101 to 115 and exclusive-OR circuits 201 to 205. The period of a PN signal generated by each of these PN generators is $(2^{15}-1)$ times the unit bit duration thereof. That is, the period of an output sequence of each of these PN generators is 32767 $(=2^{15}-1)$ bits. Thus, each of these PN generators repeatedly outputs a pseudo-random code of the same pattern every period of 32767 bits.

As is easily understood from the configuration of each of the PN generators, a sequence consisting of arbitrary N bits data appears only once in one period of a PN sequence. Thus, if N bits data of the output sequence are known, the operation timing of each of the PN generators can be specified.

Namely, when arbitrary N bits data of output bits of the PN generator are transmitted from a transmitting side, the operation timing of the PN generator placed at the transmitting side can be known by analyzing the N bits data at a receiving side.

An example of a method of obtaining the timing at the receiving side will be described hereinbelow by referring to FIG. 5. First, a PN sequence consisting of (32767) bits of one period is preliminarily prepared. Subsequently, shifts between a sequence consisting of N bits data (namely, 15 bits in the case of this example) to be checked and the PN sequence are sequentially found by performing pattern matching therebetween. Thus, the operation timing of the PN generator provided at the transmitting side is specified by this method.

Next, the configuration and operation of an embodiment of the present invention will be described hereunder by referring to FIG. 3, which is a block diagram illustrating the configuration of the embodiment of an commercial time synchronization system of the present invention.

A multiplexing circuit 11 of a upstream station is operative to send a downstream station a transmission information data sequence including commercial transmission information data and a PN signal sequence. A PN generator 12 is operative to generate a PN signal and to supply the PN signal to the multiplexing circuit 11. A master timing generator 15 is operative to generate a master timing signal. A demultiplexing circuit 13 demultiplexes the transmission information data sequence sent from the downstream station into the transmission information data and the PN signal sequence.

A timing detection circuit 14 is operative to detect the timing error between the PN signal sequence supplied from the multiplexing circuit 13 and that generated by the PN generator 12, and to generate timing correction information corresponding to the timing error detected as a result. The timing detection circuit 14 is operative to supply this timing correction information to the PN generator 12 and the master timing generator 15. The PN generator 12 is operative to correct the operation timing based on the timing correction information supplied from the timing detection circuit 14. The master timing generator 15 is operative to correct the master timing based on the timing correction information supplied from the timing detection circuit 14.

A multiplexing circuit 21 of the downstream station is operative to send the upstream station a transmission information data sequence including commercial transmission information data and a PN signal sequence. A PN generator 22 is operative to generate a PN signal and to supply the PN signal to the multiplexing circuit 21. A master timing generator 25 is operative to generate a master timing signal. A demultiplexing circuit 23 demultiplexes the transmission information data sequence sent from the upstream station into the transmission information data and the PN signal sequence.

A timing detection circuit 24 is operative to detect the timing error between the PN signal sequence supplied from the multiplexing circuit 23 and that generated by the PN generator 22, and to generate timing correction information so as to eliminate the detected timing error. The timing detection circuit 24 is operative to supply this timing correction information to the PN generator 22 and the master timing generator 25. The PN generator 22 is operative to correct the operation timing based on the timing correction information supplied from the timing detection circuit 24. The master timing generator 25 is operative to correct the master timing based on the timing correction information supplied from the timing detection circuit 24.

Next, an operation of the synchronization system of the present invention will be described hereinbelow. In the upstream station, the master timing generator 15 is operative to generate a master timing signal for the entire system. The master timing signal is supplied to the PN generator 12. The operation timing of the PN generator is determined according to this master timing signal.

For instance, the time when the contents of all shift registers of the PN generator 12 are 1 is determined to be "time 0". The PN generator 12 performs periodic operations. Further, let M denote the period thereof. Thus, the contents of all shift registers of the PN generator 12 become 1 at each time point t (incidentally, t=n×M (where "n" represents an integer)).

The multiplexing circuit 11 is operative to determine whether or not transmission information data to be transmitted from the upstream station to the downstream station is present. If the multiplexing circuit 11 determines that transmission information data to be transmitted from the upstream station to the downstream station is present, the transmission information data is transmitted to the downstream station. Conversely, if the multiplexing circuit 11 determines that no transmission information data to be transmitted from the upstream station to the downstream station is present, a PN signal supplied from the PN generator 12 is transmitted to the downstream station. At that time, the system should be adapted so that the PN signal can be separated from transmission information data in the downstream station.

Therefore, for instance, the system is adapted so that when a PN signal is sent, a specific information word (namely, a unique word) is sent prior to the PN signal. Thus, the multiplexing circuit is prevented from making an erroneous decision. Consequently, in the downstream station, it is decided that a signal sent thereto, subsequent to the unique word, is a PN signal. Further, as described above, when the number of stages of the PN generator 12 is N, an N-bit PN signal should be sent.

On the other hand, in the downstream station, a transmission information data sequence (including transmission information data and information represented by a PN signal) sent from the upstream station is demultiplexed by the demultiplexing circuit 23 into commercial transmission information data and the PN signal. Then, the PN signal is supplied to the timing detection circuit 24, whereupon timing information on the PN signal is detected. Thus, the timing error between the PN signal generated by the intraoffice PN generator 22 (namely, the PN generator 22 provided in the downstream station) and the PN signal received from the upstream station is detected. The timing detection circuit 24 generates timing correction information to eliminate this timing error and supplies this timing correction information to the PN generator 22 and the master timing generator 25. Then, the PN generator 22 corrects the operation timing thereof, based on this timing correction information. On the other hand, the master timing generator 25 corrects the master timing according to this timing correction information.

The PN signal outputted from the lower-rank PN generator 22 is transmitted to the upstream station through the multiplexing circuit 21. The multiplexing circuit 21 of the downstream station performs an operation similar to that of the multiplexing circuit 11 of the upstream station. Namely, the multiplexing circuit 21 of the downstream station determines whether or not transmission information data to be transmitted from the downstream station to the upstream station is present. If it is decided that transmission information data to be transmitted is present, the transmission information data is transmitted to the upstream station. If it is decided that no transmission information data to be transmitted is present, the multiplexing circuit 21 of the downstream station transmits a PN signal generated by the PN generator 22 to the upstream station.

Turning again to the upstream station, the transmission information data sequence transmitted from the downstream station and received by the upstream station is demultiplexed by the demultiplexing circuit 13 into transmission information data and a PN signal. This PN signal is supplied to the timing detection circuit 14, whereupon timing information on this PN signal is detected. The timing detection circuit 14 detects the timing error between the PN signal generated by the intraoffice PN generator 12 (namely, the PN generator 12 provided in the higher-tank office) and the PN signal received from the downstream station. This is similar to the operation of the circuit 24 of the downstream station.

An operation to be performed upon completion of the detection of the timing information is different from the aforementioned operation performed in such a situation in the case of the downstream station. Namely, the detection of the timing error in the upstream station necessarily involves the measurement of the transmission line delay caused during the reciprocating transmission of the transmission information data and/or the PN signal between the upstream station and the downstream station. For example, in the case in which the transmission delay time caused by the one-way transmission is a time $\tau$, the upstream station receives a PN signal from the downstream station by delaying an output of the PN generator 12 of the upstream station by a time $2\tau$.

Subsequently, the operation timing of the PN generator 12 of the upstream station is changed by a time ($\tau$) corresponding to half the timing error. Namely, the PN generator 12 shifts ahead the PN-signal generation timing by the time $\tau$ (that is, shifts the phase of the PN signal by an amount corresponding to time $\tau$). Assuming that the current point in time is "0", the operation timing of the PN generator 12 operates by correcting the operation timing thereof so that the contents of each of the shift registers thereof are 1 at the time point "$-\tau$" (that is, the time $\tau$ before the current time point).

Namely, the PN generator 12 operates by controlling the operating timing thereof so that the contents of each of the shift registers thereof become 1 at each time point "t" (t=n×M−$\tau$ (where "n" represents an integer)).

The PN signal, whose operation timing has been corrected, is transmitted to the downstream station again. In the downstream station, the operation timing of the PN generator 22 and the master timing signal generated by the master timing generator 25 are changed according to the received PN signal.

Namely, in the downstream station, the PN generator 22 operates by controlling the operating timing thereof so that the contents of each of the shift registers thereof become 1 at each time point "t" (t=n×M (where "n" represents an integer)). In this way, the operations of the upstream station and the downstream station are synchronized with each other.

At that time, the time synchronization accuracy of the system of the present invention is such that a transmission delay comparable to the transmission rate (about 0.7 microseconds (namely, a time corresponding to one bit of 1.5 Megabits)) of the transmission line is allowed.

In the case of a long period that is not less than the period of a PN signal, time synchronization is achieved by using a signal (which represents, for example, a control message exchanged by utilizing the commercial transmission information data) corresponding to a higher layer. Therefore, the description of such time synchronization is omitted herein. The number (N) of stages of the PN sequence may have various values. Thus, as the occasion demands, a suitable number (N) of stages may be selected.

Incidentally, when the number of stages of a PN sequence is increased, one period is lengthened. This makes the timing detection difficult to achieve. Conversely, when the number of stages of the PN sequence is decreased, the timing detection is facilitated. However, no match may be detected even when the N-bit sequence is shifted by bits of one period of the PN sequence, and thus, no time synchronization may be achieved.

Therefore, a time synchronization system using a signal corresponding to a higher layer should be suitably designed in the case of a long period. Further, a strict time synchronization system using a PN signal should be suitably designed. Such systems can be applied to both of the cases of employing STM (Synchronous Transfer Mode) and ATM (Asynchronous Transfer Mode) systems as transmission systems. Incidentally, in the case of employing the STM system, a PN signal is superimposed on a vacant slot. On the other hand, in the case of employing the ATM system, a PN signal is superimposed on a vacant cell.

Additionally, in the aforementioned embodiment, the PN generator is constituted by 15 stages of shift registers. However, the number of stages according to the present invention is not limited to 15.

Further, in the aforesaid embodiment, an M-sequence is used as a PN sequence. However, a square residue sequence or a twin prime sequence may be used as the PN sequence.

Moreover, in the aforementioned embodiment, the transmission rate of the transmission line is set at 1.5 Mbps. However, the transmission rate of the transmission line is not limited to 1.5 Mbps.

As described above, the upstream station (hereunder referred to as a first device) generates a PN signal in synchronization with a predetermined timing signal. Further, the first device transmits a multiplexing signal obtained by multiplexing a signal representing transmission information data to be transmitted and the PN signal. Moreover, the first device receives a signal transmitted from the downstream station (hereunder referred to as a second device). Furthermore, the first device demultiplexes the received signal into the transmission information data and the PN signal. Additionally, the first device detects a first timing error that is an error between the PN signal obtained by demultiplexing and the PN signal generated by the first device.

The aforementioned second device generates a PN signal in synchronization with a predetermined timing signal. Further, the second device transmits a multiplexing signal obtained by multiplexing a signal representing transmission information data to be transmitted and the PN signal. Moreover, the second device receives a signal transmitted from the aforementioned first device. Furthermore, the second device demultiplexes the received signal into the transmission information data and the PN signal. Additionally, the aforementioned second device detects a second timing error that is an error between the PN signal obtained by demultiplexing and the PN signal generated by the aforementioned second device.

In the aforesaid second device, the PN-signal generation timing is corrected in such a manner as to eliminate the second timing error. In the aforementioned first device, the PN-signal generation timing is shifted ahead by a time corresponding to half the first timing error.

Consequently, according to the synchronization system and method and the recording medium of the present invention, strict commercial time synchronization is realized with accuracy of such a degree that a transmission delay being comparable to the transmission rate of a transmission line is allowed.

Although a preferred embodiment of the present invention has been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A synchronization system having a first device and a second device, wherein
    said first device comprises:
        a first PN signal generator which generates a PN signal in synchronization with a predetermined timing signal;
        a first multiplexer which transmits a first multiplexing signal obtained by multiplexing transmission information data to be transmitted and said PN signal;
        a first demultiplexer which receives a signal transmitted from said second device and which demultiplexes the received signal into the transmission information data and the PN signal; and
        a first detector which detects a first timing error that is an error between said PN signal obtained by demultiplexing and said PN signal generated by said first PN signal generator;
    said second device comprises;
        a second PN signal generator which generates a PN signal in synchronization with a predetermined timing signal;
        a second multiplexer which transmits a multiplexing signal obtained by multiplexing transmission information data to be transmitted and said PN signal;
        a second demultiplexer which receives a signal transmitted from said first device and which demultiplexes the received signal into the transmission information data and the PN signal; and
        a second detector which detects a second timing error that is an error between said PN signal obtained by demultiplexing, and said PN signal generated by said second PN signal generator,
        said second PN signal generator correcting operation timing so as to cancel said second timing error detected by said second detector, and
        said first PN signal generator shifting operation timing ahead by a time corresponding to half the first timing error detected by said first detector.

2. The synchronization system as claimed in claim 1, wherein:

said first device further comprises first timing signal generator which generates a predetermined timing signal, and said second device further comprising second timing signal generator, said first PN signal generator determining operation timing thereof in synchronization with a timing signal generated by said first timing signal generator, said second PN signal generator determining an operation timing thereof in synchronization with a timing signal generated by said second timing signal generator.

3. The synchronization system as claimed in claim 1, wherein:

said first multiplexer transmits arbitrary N bits data in said PN signal generated by said first PN signal generator when there is no transmission information data to be transmitted, and said second multiplexer transmitting arbitrary N bits data in said PN signal generated by said second PN signal generator when there is no transmission information data to be transmitted.

4. The synchronization system as claimed in claim 1, wherein:

said first and said second multiplexer transmit predetermined discrimination information immediately before said PN signal is transmitted, and said first and said second demultiplexer regard signals transmitted immediately after said discrimination information as PN signals.

5. The synchronization system as claimed in claim 1, wherein:

said first detector detects said first timing error by searching in a pattern of one period of a PN signal generated by said first PN signal generator for a sequence N-bit pattern matching an N-bit pattern of said PN signal obtained by demultiplexing, and said second detection means detects said second timing error by searching in a pattern of one period of a PN signal generated by said second PN signal generator for a sequence N-bit pattern matching an N-bit pattern represented by a PN signal obtained by demultiplexing.

6. The synchronization system as claimed in claim 1, wherein:

said second device performs timing control so that a pattern of a PN signal generated by said first PN signal generator at a time point (t–τ) matches a pattern of a PN signal generated by said second PN signal generator at the time point t, τ designating a time period during which transmission information data is transmitted from said first device to said second device, while t denoting a current time point.

7. A method of synchronizing between a first device executed based upon a first process and a second device executed based upon a second process, wherein:

said first process comprises:

generating a first PN signal in synchronization with a predetermined timing signal in the first device;

multiplexing transmission information data and said first PN signal and transmitting the first multiplexed signal to the second device;

receiving a second multiplexed signal from said second device and demultiplexing the received signal into transmission information data and a second PN signal; and detecting a first timing error that is an error between said first PN signal and said second PN signal;

said second process comprises:

generating said second PN signal in synchronization with a predetermined timing signal in the second device;

receiving said first multiplexed signal from said first device and demultiplexing the received signal into transmission information data and a first PN signal;

multiplexing transmission information data and said second PN signal and transmitting the second multiplexed signal to the first device; and detecting a second timing error that is an error between said second PN signal and said first PN signal;

correcting timing of said second PN signal so as to cancel said second timing error detected at the detecting step in the second PN signal generating step; and correcting timing of said first PN signal by shifting ahead by a time corresponding to half the first timing error detected at the detecting step in the first PN signal generating step.

8. A recording medium for use in a synchronization system for synchronizing first and second devices, said first and said second devices respectively performing a first process and a second process, said recording medium recording a program to execute one of said first process and said second process, wherein said first process comprises:

generating a first PN signal in synchronization with a predetermined timing signal in the first device;

multiplexing transmission information data and said first PN signal and transmitting the first multiplexed signal to the second device;

receiving a second multiplexed signal from said second device and demultiplexing the received signal into transmission information data and a second PN signal; and detecting a first timing error that is an error between said first PN signal and said second PN signal;

said second process comprises:

generating said second PN signal in synchronization with a predetermined timing signal in the second device;

receiving said first multiplexed signal from said first device and demultiplexing the received signal into transmission information data and a first PN signal;

multiplexing transmission information data and said second PN signal and transmitting the second multiplexed signal to the first device; and detecting a second timing error that is an error between said second PN signal and said first PN signal;

correcting timing of said second PN signal so as to cancel said second timing error detected at the detecting step in the second PN signal generating step; and correcting timing of said first PN signal by shifting ahead by a time corresponding to half the first timing error detected at the detecting step in the first PN signal generating step.

9. A first apparatus in a system of synchronizing between a first apparatus and a second apparatus comprising:

means for generating a first PN signal in synchronization with a predetermined timing signal in the first apparatus;

means for multiplexing transmission information data and said first PN signal and transmitting the first multiplexed signal to said second apparatus;

means for receiving a second multiplexed signal from said second apparatus and demultiplexing the received signal into transmission information data and a second PN signal;

means for detecting a first timing error that is an error between said second PN signal obtained by said means for receiving the second multiplexed signal and said first PN signal generated by said first PN signal generator;

means for correcting timing of said first PN signal by shifting ahead by a time corresponding to half the first timing error detected.

* * * * *